United States Patent [19]

Hynes et al.

[11] Patent Number: 5,254,843
[45] Date of Patent: Oct. 19, 1993

[54] SECURING MAGNETICALLY ENCODED DATA USING TIMING VARIATIONS IN ENCODED DATA

[76] Inventors: John E. Hynes, 6417 Deer Park Rd., Reistertown, Md. 21136; Stephen A. Conner, 3631 Yolando Rd., Baltimore, Md. 21218

[21] Appl. No.: 741,762

[22] Filed: Aug. 7, 1991

[51] Int. Cl.$^5$ ............................ G06K 7/00; G06K 5/02
[52] U.S. Cl. ................................ 235/449; 340/825.34; 235/493
[58] Field of Search ..................... 235/449, 493, 450; 340/825.34; 380/3, 22

[56] References Cited

U.S. PATENT DOCUMENTS

| | | | |
|---|---|---|---|
| 4,023,204 | 5/1977 | Lee | 235/488 |
| 4,038,596 | 7/1977 | Lee | 235/449 |
| 4,180,207 | 12/1979 | Lee | 235/440 |
| 4,423,415 | 12/1983 | Goldman | 235/493 |
| 4,476,468 | 10/1984 | Goldman | 235/380 |
| 4,628,195 | 12/1986 | Baus | 235/440 |
| 4,650,978 | 3/1987 | Hudson et al. | 235/380 |
| 4,788,420 | 11/1988 | Chang et la. | 235/449 |
| 4,837,426 | 6/1989 | Pease et al. | 235/440 |
| 4,906,988 | 3/1990 | Copella | 235/449 |
| 5,177,344 | 1/1993 | Pease | 235/449 |

OTHER PUBLICATIONS

"The XSec Security System for Magnetic Media and Data Verification: By XTec, Inc", Feb. 1991, pp. 1-8, FIGS. 1-4.

Primary Examiner—John Shepperd
Assistant Examiner—Esther Chin
Attorney, Agent, or Firm—Richard M. McMahon

[57] ABSTRACT

This invention relates to a method of securing magnetically encoded data from altering, forging, or counterfeiting. The invention pertains to magnetic storage media such as magnetic tape, magnetic striped cards, and other documents or objects which contain magnetic media. This invention utilized the inherent variations in the timing of magnetically encoded data in combination with the random effect of the magnetic media. Data is protected by reading the original encoded data just after encoding and storing this initial timing data stream. It is authenticated by a comparison of the timing data stream of any subsequent reading of this encoded data to the original timing data stream. Acceptance criterion depends on the magnetic media and applications chosen.

29 Claims, 9 Drawing Sheets

Bits per Inch - Bit Periods per Inch } BPI
or
Binary Bits per Inch } BPI
Bit Length = 1 ÷ BPI
1 Flux Reversal per Binary Bit
T - Period of the Square Wave Write Current
f = 1 ÷ T frequency
L - Wavelength of Alternating Magnetization
L = 2 Flux Reversals = 2 Bit Lengths
BPI = FRPI
f x L = v Velocity of Media f = v ÷ (2BL) = V(BPI) ÷ 2 = v(FRPI) ÷ 2

FIGURE 2

Variations In Encoded Data

75 Binary Zeros per inch - 75 FRPI

75 Bit Periods per inch

150 Binary Ones per inch - 150 FRPI $BL(0) = 1 \div 75 = 13.3$ mils   $L = 26.6$ mils $BL(1) = 1 \div 150 = 6.6$ mils   $L = 13.3$ mils $f = v \div L = v(FRPI) \div 2$ for $v = 7.5$ ips $f(O) = 7.5 \div 0.0266$ in $= (7.5) \times (75) \div 2 = 281$ Hz $f(I) = 7.5 \div 0.133$ in $= (7.5) \times (150) \div 2 = 562$ Hz $T(O) = 1 \div f(O) = 3.56$ milli seconds $T \div 2 = 1.78$ milli seconds between pulses $T(1) = 1 \div f(1) = 1.78$ milli seconds $T \div 2 = 890$ micro seconds between pulses

(FIG 6) PAGE 1

(FIG 6) PAGE 2

SECURING MAGNETICALLY ENCODED DATA USING TIMING VARIATIONS IN ENCODED DATA

BACKGROUND OF THE INVENTION

Magnetically encoded data can be readily copied and transferred from one magnetic storage media, such as magnetic striped plastic cards, to another magnetic media or plastic, such as magnetic striped paper cards or magnetic tape. The role of the magnetic striped paper and plastic card has grown rapidly since the first bankcard credit program was launched in 1946. This rapid growth has been accompanied by an even greater opportunity for fraud and counterfeiting. Altering, copying, and counterfeiting are longstanding and well known growing problems in the payment systems industry.

Magnetic stripe technology is utilized by the payment systems industry in the United States and on a worldwide basis. The physical characteristics of the magnetic stripe are explicitly specified, encoding standards are well defined, and the specifications are contained in publicly available standards such as ISO standard 7811/2-1985(E) which describes the encoding associated with such cards. Magnetized regions in the strip, representing digital data, are encoded using these established standards to represent binary digits 0 and 1. Encoding electronics set-up the specification to place the data in a timing sequence that appears as a spatial sequence on the magnetic stripe. Decode electronics require a minimum readback signal amplitude to detect the flux reversal position and the timing between flux reversals provide for the data to be decoded. Magnetic strip technology has been utilized in many applications where security and reliability have been compromised by the ease by which the data can be re-encoded and read.

Historically, various techniques and attempts have been made to authenticate the magnetically encoded data and protect such documents from counterfeiting. One known technology is disclosed in U.S. Pat. No. 4,023,204 issued to Lee for Watermark Magnetics. The Watermark Magnetics technology relies on a predetermined structuring of the magnetic particles as the magnetic tape is being made. A predetermined structure is oriented and solidified into the magnetic particle alignment when the slurry of magnetic material is dried onto the tape backing during the manufacturing process. This is similar to placing aligned sticks into a concrete mix in which the sticks remain in that alignment when the concrete slurry has dried. The detection and decoding of this pattern requires special magnetic read heads and decode circuits which are sensitive to the alignment of the magnetic particles. This method has proven to be reliable but expensive and resulted in increased manufacturing costs.

Another type of document security system is disclosed in U.S. Pat. No. 4,423,415 issued to Goldman which uses light absorption by paper to derive a unique characteristic for the specific document. The unique characteristic is derived from physical inherent properties of the random position and the light absorption of the paper fibers within the document itself. It is related to absorption of a light beam to read and reproduce the characteristic which is an analog wave shape of the light absorption pattern or a digitized number that represents the analog characteristic. This can be used to recreate the analog wave shape characteristic and compared to the subsequent verification of the original document. The technology disclosed by Goldman relates to visible light and the variable absorption of light by random paper fibers.

A variation in the above described optically based system to authenticate magnetically based information is described in U.S. Pat. No. 4,650,978 issued to Hudson and Fernandez. The system described by the Hudson patent uses the intrinsic properties of the magnetic stripe to shift the amplitude of the wave form of an analog recording. The method utilizes a shift in the amplitude of a non-saturated analog recording which can not be applied to a shift in the timing sequence of digital saturation encoding. The use of analog patterns is complex, hard to analyze, and requires the use of expensive circuitry.

U.S. Pat. No. 4,837,426 issued to Pease et al. also uses intrinsic variations of the magnetic media to produce variations in the signal amplitude for both digital and analog signals. This patent depends on detecting a continuous, unique, permanent and randomly varying characteristic of the recordable region of magnetic material being sensed which is the signal amplitude and does not include any component from the random and inherent variations in the timing of magnetically encoded data. The Pease patent discloses a method and an amplifier apparatus to enhance the detectability of the sensed random magnetic media characteristic by recording an electrical signal to produce variations in the signal amplitude. Practicing the method of this patent requires sensing the amplitude signal of permanent and randomly varying magnetic characteristics of magnetic media through shifts in the amplitude of the digital encoding which is then used to form a unique representation. This representation is subsequently encoded onto a separate track of the magnetic material or stored in a central data base for latter comparisons. This technique utilizes amplitude ratios not random timing variations in the encoded data to develop the unique representation; so copying and counterfeiting can be accomplished through such techniques as high frequency bias recording and electronic copy circuits.

Each of the known systems appear to be somewhat effective in authenticating magnetically encoded information but each such system heretofore has limitations. Optical based verification systems require reflective light or translucent media. Reflective light systems can not be used to verify many types of objects. Structured magnetic tapes require expensive special magnetic tape and special reading equipment. Use of amplitude ratios, distinct magnetic layers, and analog patterns are complex, hard to interface with existing systems; and in some cases, the security feature can be compromised by the use of high frequency bias recording, accurate copying device, or other relatively simple methods.

An object of this invention is to use the inherent properties of standard magnetic storage media to secure the data by utilizing the inherent variations in the timing of magnetically encoded data. This results in not requiring special read heads to read security codes in separate tracks. A further object of this invention is to achieve the improved security benefits with high coercivity tape, Watermark Magnetic tape, and other special magnetic media materials.

Another object of this invention is to use simple cost effective digital techniques to secure the data from alteration, counterfeiting, skimming, and buffering. The present invention utilizes the variations in flux timing locations or jitter to develop a unique and repeatable identification characteristic for encoding magnetic stripes which is identified herein as the Jitter Signature.

A further object of this invention is to utilize the innate jitter pattern of other magnetic technologies, such as Watermark Magnetics to develop and encode a Jitter Signature number for that Watermark Magnetics jitter pattern. The Watermark Magnetics Jitter Signature number is encoded in a standard track to bond the user's data to the permanent Watermark Magnetics pattern that can not be copied to another card.

Another object is to use the innate pattern contained in Watermark Magnetics to further enhance the Jitter Signature of the F2F encoding.

An object of this invention is to purposefully modify the bit period jitter present in encoded magnetic media by a quantity greater than the random intrinsic bit to relative jitter. This jitter modification or modulation is achieved by modifying the standardized Akien Double Frequency F2F encoding bit periods and not the F2F bit value itself. These jitter enhancing techniques may be applied to structured magnetic technologies such as Watermark Magnetics or high coercivity tapes.

This invention possesses other objects and features of advantage which will become apparent from the following description taken in conjunction with the accompanying drawings.

SUMMARY OF THE INVENTION

In accordance with the invention, a method of securing magnetically encoded data by a means of using inherent variations in the timing of encoded data combined with the random and enhanced effect of the magnetic media which includes deriving by reading the encoded data after initial encoding; storing the initial timing data stream by representation as a unique number, comparing the timing data stream of any subsequent reading of the encoded data to the original stored representation, and indicating the results of the comparison to the user or system applications.

DETAILED DESCRIPTION

Referring to the drawings for a better understanding of the present invention, this invention is susceptible to embodiment in many different forms, the description which follows should be viewed as an illustration of principles of the invention and is not intended to limit this invention to the specific embodiment illustrated in the drawing.

Figure 1A:
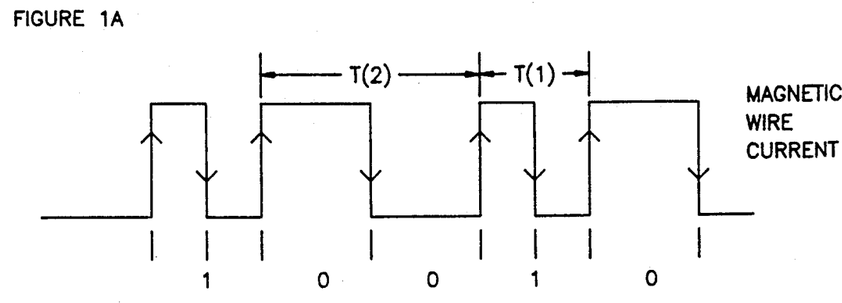
FIG. 1A is a plot of digital signal depicting F2F write current as a function of time.

FIG. 1A shows standard F2F encoding with binary 1's and 0's depicted whereby a binary 1 is a bit cell that contains a flux reversal somewhere near the mid point. A binary 0 is shown in FIG. 1A as a bit cell that does not contain a flux reversal within its boundaries. The decision point is a timing position within the bit period that is set by the electronics. If there is no flux reversal before the decision point, the bit is a binary 0. If there is a flux reversal before the decision point, the bit is a binary 1. Typical values of the decision point for F2F encoding range from 67% to 75% of the bit period.

Figure 1B:
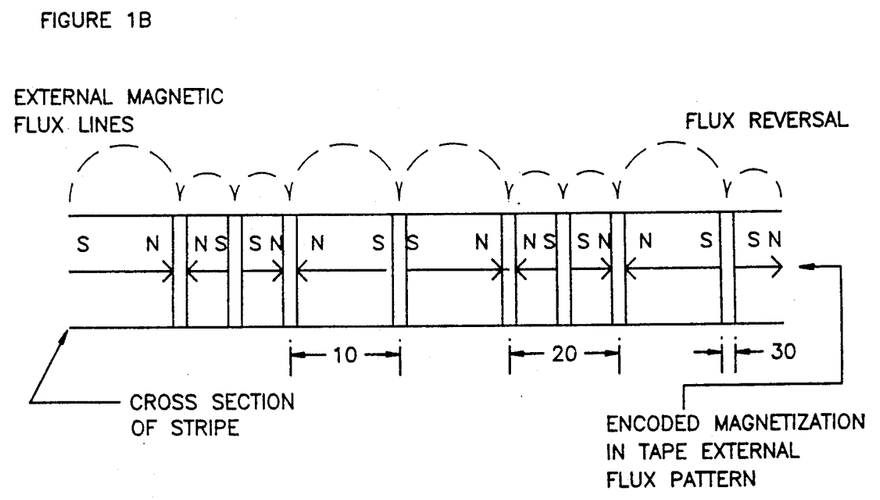
FIG. 1B is an enlarged spatial plot of external magnetic flux lines from a F2F encoded cross section of a magnetic stripe.

FIG. 1B shows the external magnetic flux lines and north-south magnetic polarity for the corresponding F2F encoding depicted in FIG. 1A. 10 is a bit period in length each corresponding to a binary 0 with no flux reversal. 20 is one bit in length corresponding to a single binary 1 with one flux reversal within the bit period. 30 shows the variability in location of a flux reversal.

Figure 1C:
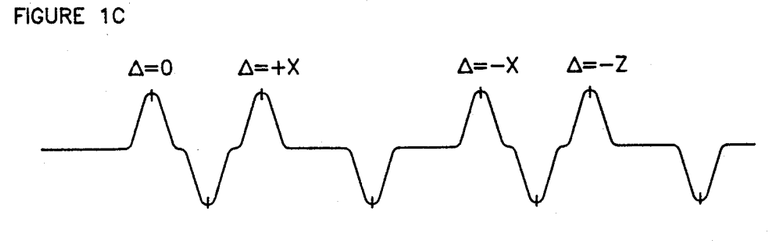
FIG. 1C is a plot of a readback signal amplitude of the encoded magnetic data corresponding to the encoding with jitter variations for individual pulses (delta values) shown in FIGS. 1A and 1B.

FIG. 1C depicts the readback signal amplitude for the identical F2F encoding of FIG. 1A and FIG. 1B from a magnetic read head circuit electronics with each delta value shown as a timing deviation from the ideal location of the flux reversal peak (jitter). It is these delta values that comprise the unique Jitter Signature number of the encoded data on the magnetic media and are inherent variations in the timing of the encoded data.

Figure 2:
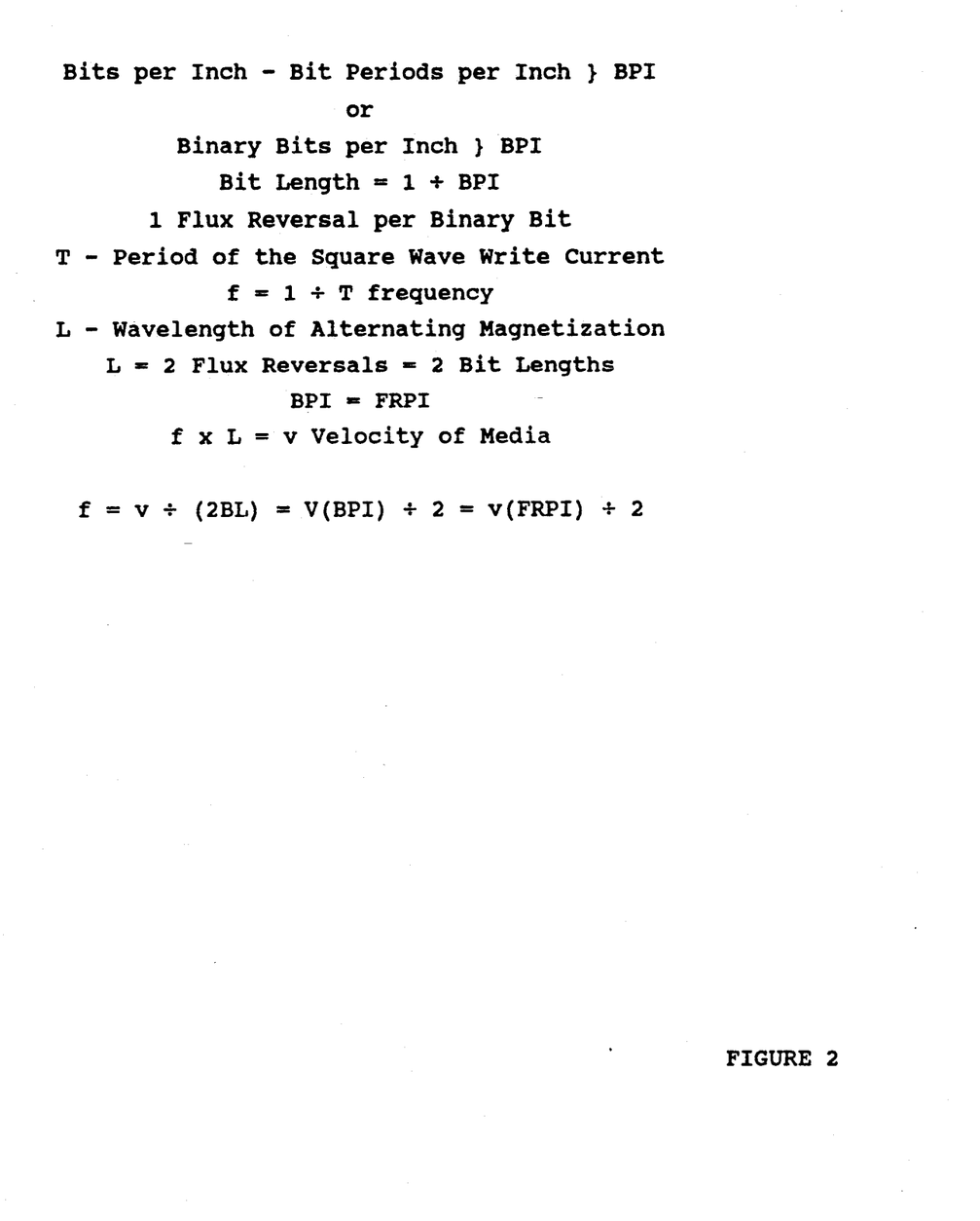
FIG. 2 is a chart describing the relationships of F2F encoding parameters.

FIG. 2 illustrates the general relationships between the encoding parameters of FIG. 1A and FIG. 1B. The dimensional positions of flux reversals on the encoding are fixed by these relationships.

Figure 3:
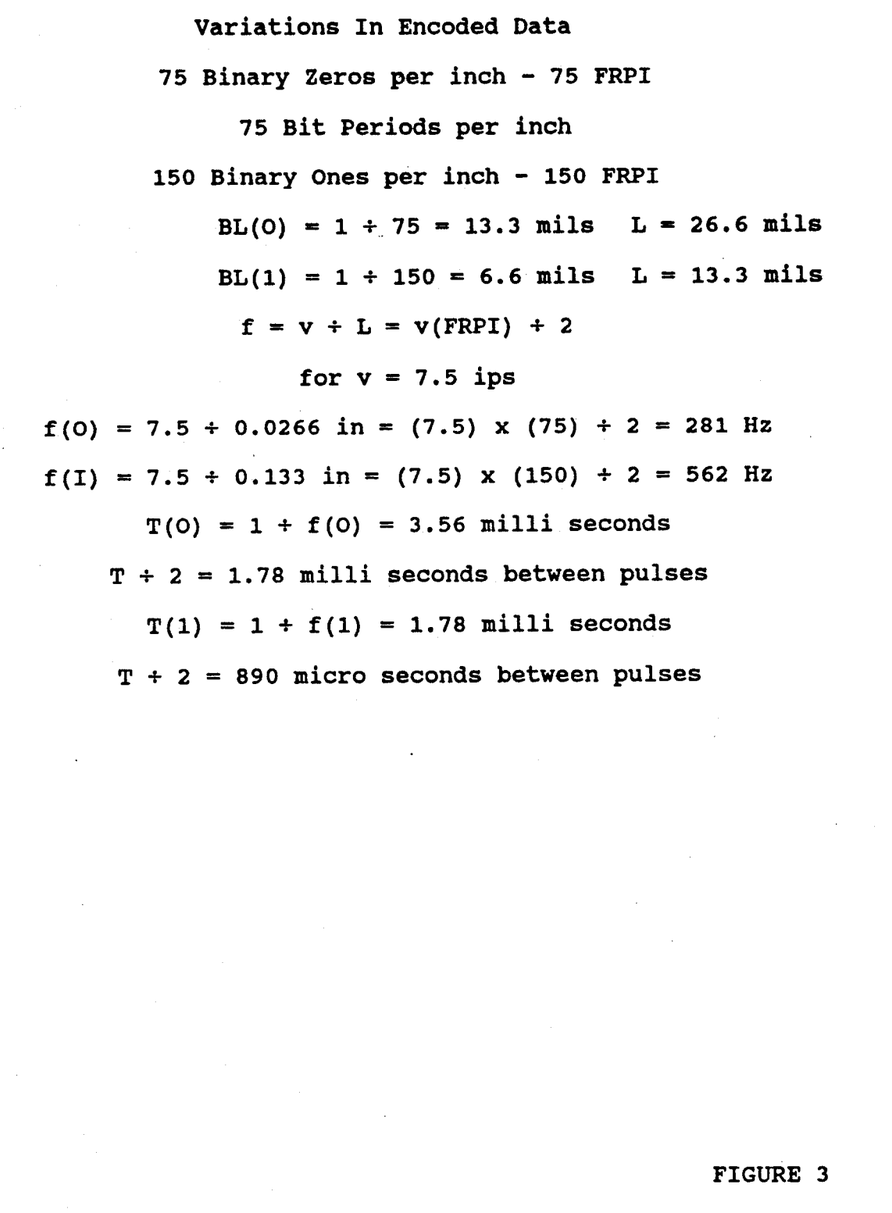
FIG. 3 is a chart describing the precise relationships of F2F encoding parameters for 75 BPI encoding at a velocity of 7.5 IPS.

FIG. 3 illustrates the precise mathematical relationships between the encoding parameters for 75 BPI on Track 2, American Bankers Association F2F encoding standard for this read only track with an encoding speed of 7.5 inches per second. The bit period at 75 BPI is 0.013333 inches and the midpoint bit period is 0.006666 inches which are absolute and in perfect spatial position of the center of the flux reversal with no jitter. Deviations, either plus or minus, from these nominal fixed locations for the center of the flux reversals is jitter as shown in FIG. 1C.

ISO 7811/2-1985(E) established specifications for absolute jitter tolerances for binary zeros located in Track 2 as plus or minus 3%; and for binary ones as plus or minus 4%. For binary zeros located in Track 1 at 210 BPI as plus or minus 5% and for binary ones located in Track 1 as plus or minus 7%. As indicated by these specifications, the higher the encoding density, the greater the jitter is as induced by spacing and other factors.

Figure 4:
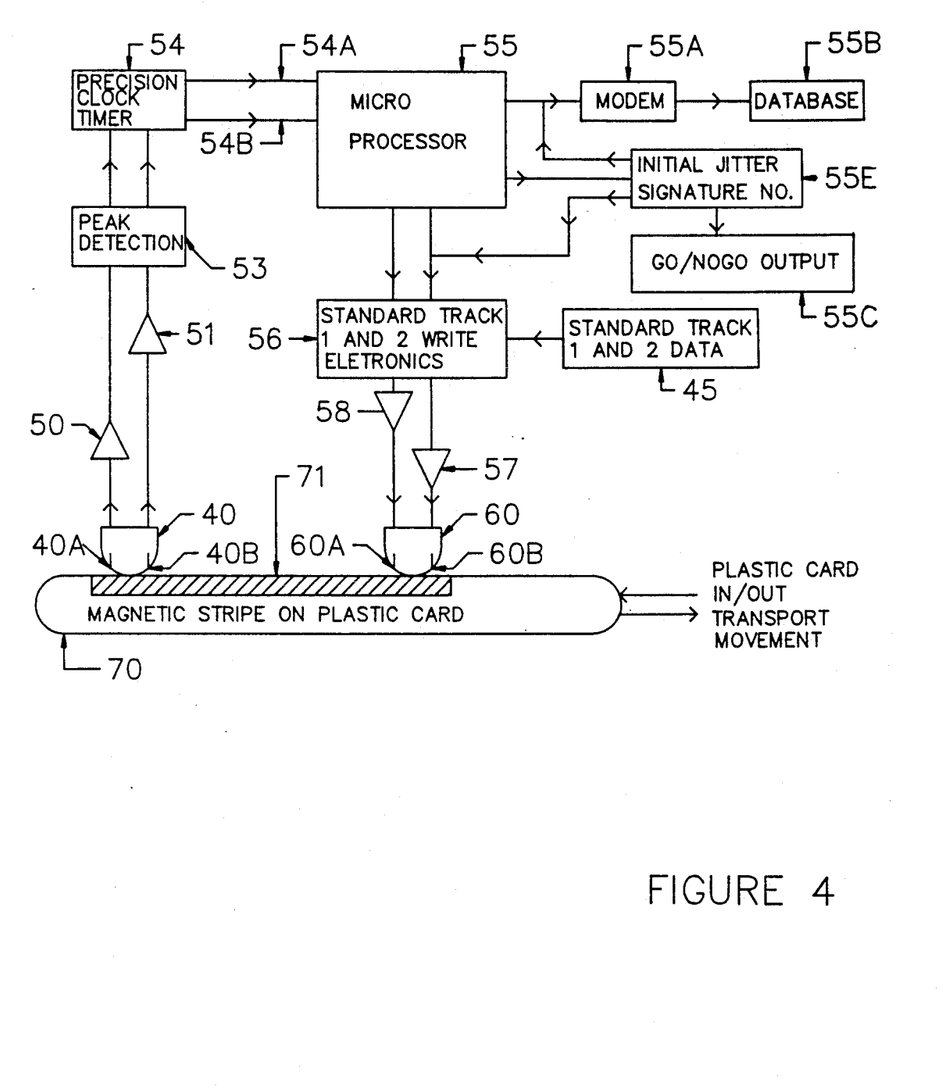
FIG. 4 is a block diagram schematic of Jitter Signature apparatus.

FIG. 4 illustrates an apparatus capable of encoding a magnetic stripe 71 on a plastic card 70 by an encoding write head 60 which can encode Track 1 and Track 2 with data through encoding driver 58 for Track 1 and encoding driver 57 for Track 2. The write head 60 is stationary and the magnetic stripe 71 on plastic card 70 is moved past write head 60 and read head 40 by the card transport device at a velocity determined by the transport device with either an in or an out transport movement. Track 1 data is encoded at 210 BPI by write head segment 60A of write head 60 while concurrently Track 2 data is encoded at 75 BPI by write head segment 60B. Other encoding densities may be encoded and write head 60 can be equipped with a plurality of write head segments to concurrently encode a plurality of tracks of data.

The entire encoding process is electronically controlled by microprocessor 55 which can send a Jitter Signature number 55E to the modem 55A for transmission of data to database 55B or to 45 for encoding on the magnetic stripe. Microprocessor 55 is also equipped with output device 55C which provides a go/no-go signal for further processing.

The encoded data is read by read head 40 just after encoding and the initial timing data stream is analyzed by the signal peak detector 53 and the precision clock timer 54 after amplification from read amplifiers 50 and 51. The encoded data read from Track 1 is measured and the resulting signal timing calculations delivered to microprocessor 55 by Track 1 channel 54A and resulting signal timing calculations delivered to microprocessor 55 by Track 2 Channel 54B. Each signal calculation is processed by the logic of microprocessor 55 and an initial unique Jitter Signature number 55E is produced for the particular data on that particular magnetic media. The unique representation of initial Jitter Signature number 55E of the encoded data can be a unique digital number derived from one or more jitter calculations. The Jitter Signature algorithm and correlation comparison are integral parts of microprocessor 55. The initial Jitter Signature number 55E represents the timing of the flux reversal data stream of that particular magnetic encoded data.

Read amplifier 50 for Track 1 and 51 for Track 2 provide signal amplification for each read track. Read amplifier 50 is electronically coupled to peak detector 53 which senses the peak signal and generates a control signal which is fed to precision clock timer 54 and signal timing fed to microprocessor 55 by Track 1 Channel 54A and Track 2 Channel 54B. The apparatus can be equipped with a plurality of channels to feed the encoding signal timing to microprocessor 55 from a plurality of tracks of encoded data.

This initial Jitter Signature number 55E can be stored on the magnetic encoding in magnetic stripe 71 on plastic card 70 in a security field. This can be accomplished by sending the initial Jitter Signature number 55E from the microprocessor 55 to the standard encoding 45 and write electronics 57 and 58 to the write head 60. The initial Jitter Signature number can be encoded in an open data field in Track 1 or 2 or at the end of the data in the trailing zeros or in a separate data track in a second pass of the card 70 under the write head 60. Alternatively, it can be outputed to modem 55A for transmission to database 55B. The initial Jitter Signature number 55E is used to check the encoded data for authenticity each time the encoded data is read. The data authenticity check consists of reading the encoded data and performing the same algorithm calculations by microprocessor 55 as when the data was initially encoded with the subsequent Jitter Signature number compared to the initial Jitter Signature number 55E. Alternatively the current data timing sequence can be compared to the initial timing sequence directly by generating the initial timing sequence from the stored initial Jitter Signature number. The resulting correlation comparison can feed to output device 55C to display or print out the results of this go or no-go comparison based on the electronics logic or microprocessor 55 which incorporates the acceptance criterion of the magnetic media and the particular application.

Figure 5:
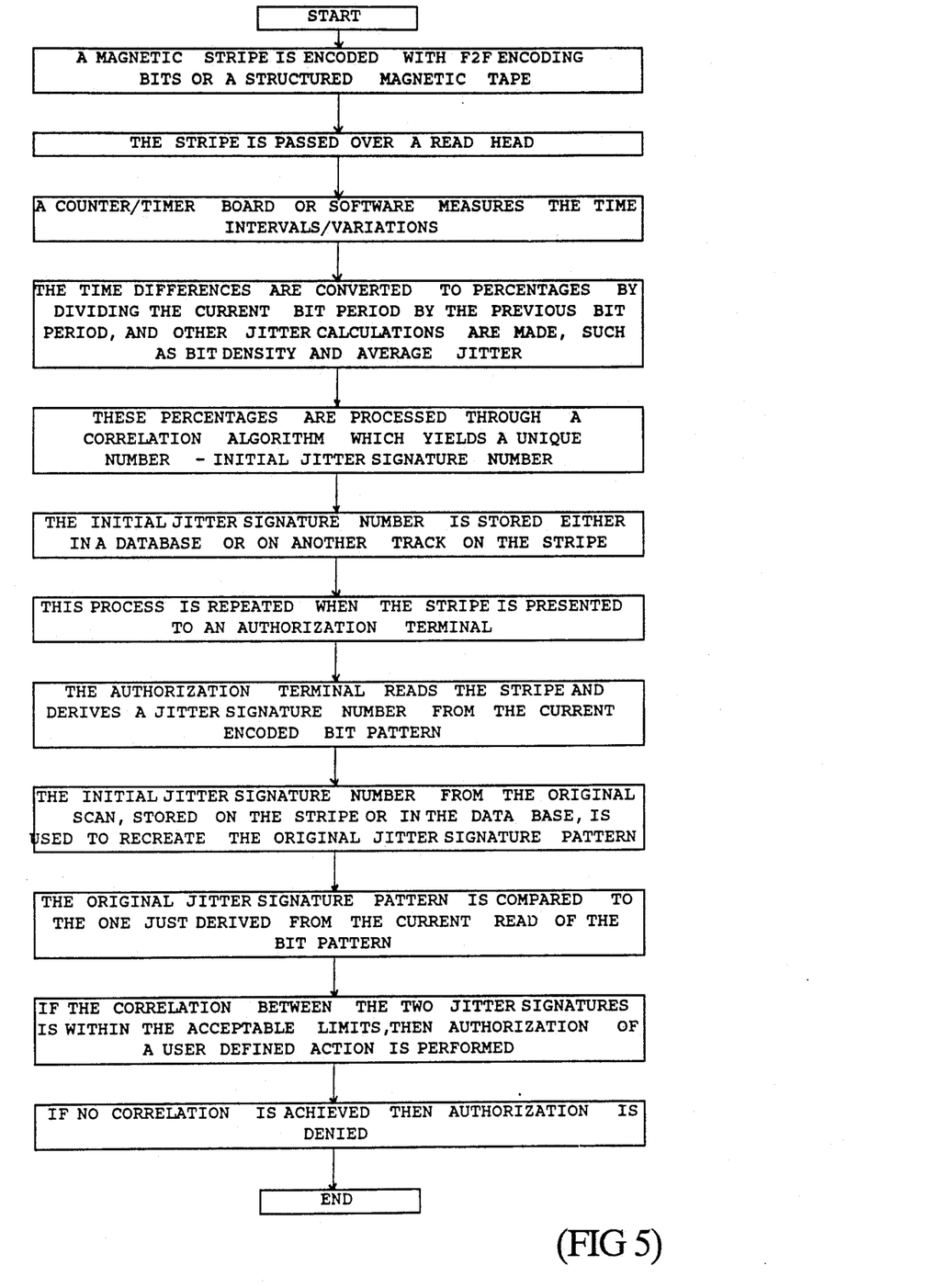
FIG. 5 is a flow chart of the steps of the Jitter Signature encoded data authenticity process.

FIG. 5 illustrates the distinct steps in the Jitter Signature process and verification of the authenticity of the magnetically encoded data by an authorization terminal using this process.

Figure 6:
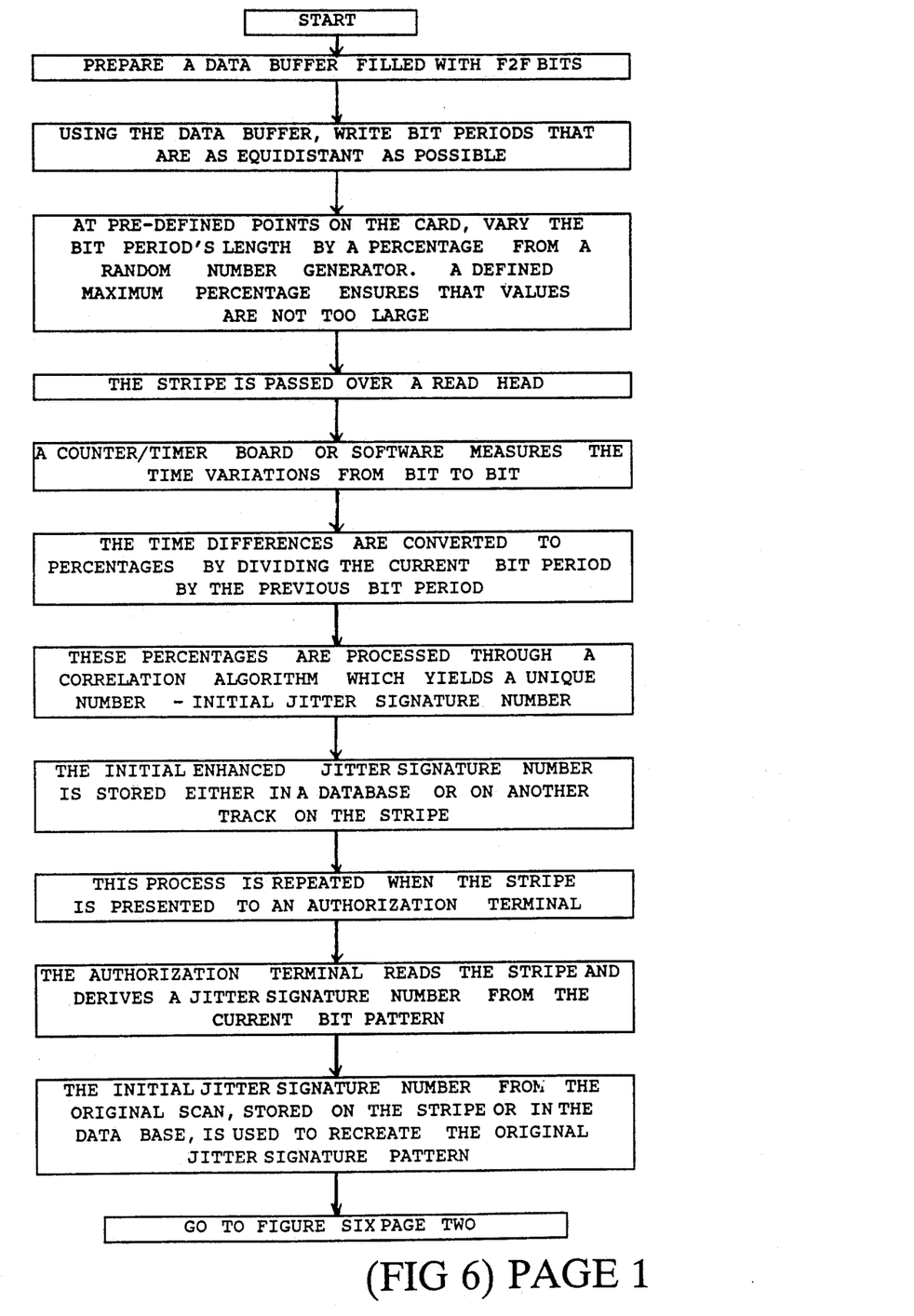
FIG. 6 is a flow chart of the steps of a preferred embodiment to enhance the Jitter Signature process.

FIG. 6 illustrates the steps in the process for a preferred embodiment for the enhanced Jitter Signature. There are several methods available to enhance the jitter such as to control the rate of flux change in the write head, enhance magnetic media distortion; by recording a plurality of random saturated flux transitions along the magnetic media; and to supplement or enhance the normal level of jitter with a controlled amount of deliberate jitter.

The preferred embodiment illustrated in FIG. 6 is a method to enhance the level of jitter with a controlled or defined percentage of deliberate jitter. The amount of deliberate jitter can remain random through the use of a random number generator as illustrated in FIG. 6 with a maximum percentage controlled by the logic of microprocessor 55 shown in FIG. 4.

The initial Jitter Signature number can be encrypted using an encryption algorithm contained in the logic of microprocessor 55 as shown in FIG. 4 or encoded on the magnetic stripe 71 on plastic card 70 in an available part of the magnetic stripe or in a security field. If a higher level of security is desirable, an encrypted initial Jitter Security number can be stored in the database 55B of FIG. 4 or encoded in the magnetic stripe 71 through the logic of microprocessor 55.

Figure 7:
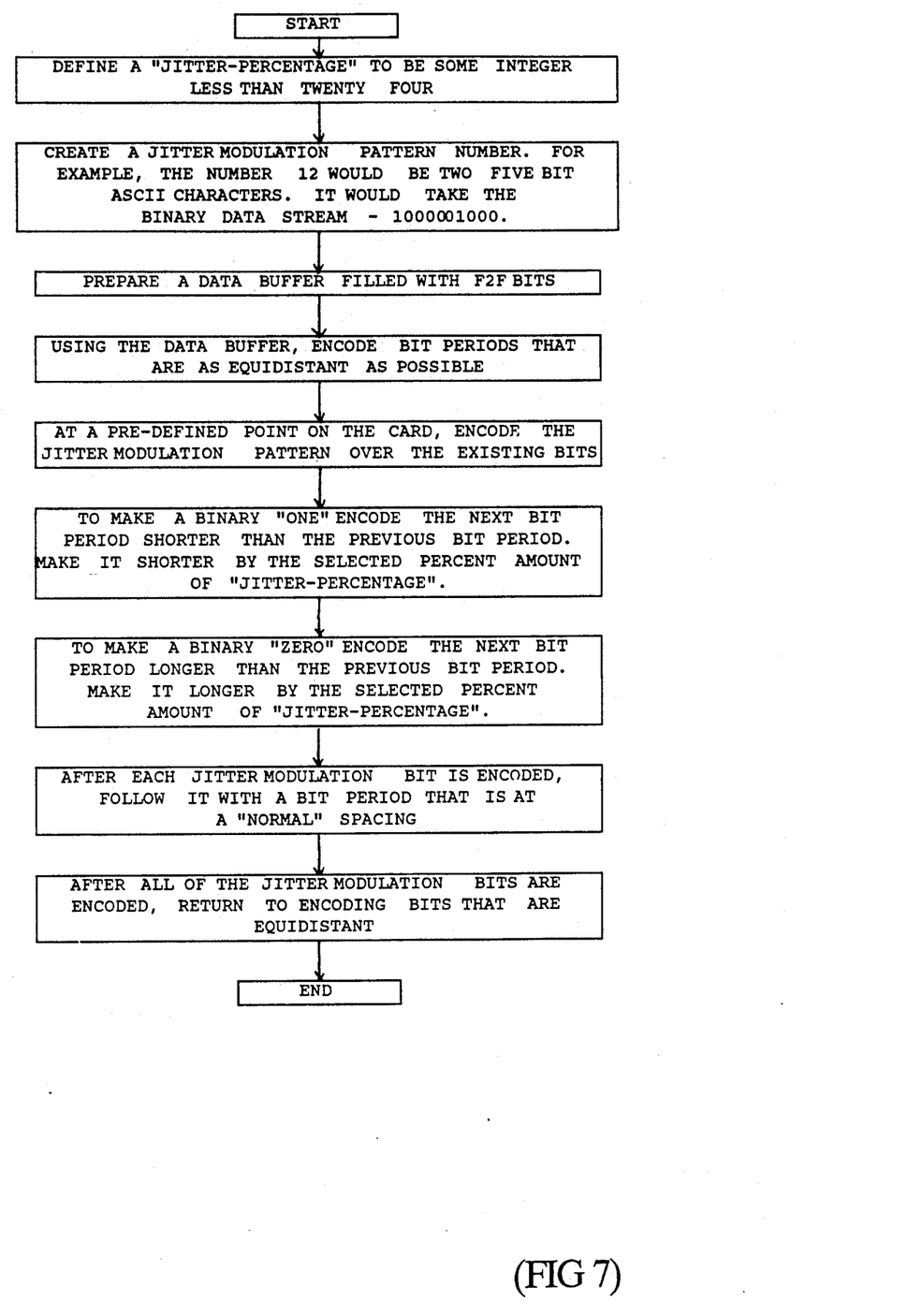
FIG. 7 is a flow chart of the steps of the process of creating a Jitter Signature which can be translated into a predetermined number.

Another embodiment of this invention is illustrated in FIG. 7 which outlines the steps to create a Jitter Signature number which can be translated into a predetermined number. A jitter percentage can be selected for any integer less than twenty-four. The jitter modulation pattern number can be created by using five bit ASCII characters and filling a data buffer with F2F bits. Bit periods, using that data buffer, are encoded as equidistant as possible. At predetermined points on the magnetic media the jitter modulation pattern is encoded over the existing F2F bits. To make a Binary 1, the next bit period encoded is shorter than the previous bit period by the selected percent of the jitter percentage. To make a binary 0, the next bit period encoded is longer than the previous bit period by the exact selected percent of the jitter percentage. The steps in this preferred embodiment are controlled by the logic of microprocessor 55 which can also provide the electronics to follow each jitter modulation bit encoded with a bit period that is at normal spacing. The encoding bits which are encoded after all jitter modulation bits are encoded are again as equidistant as possible. The embodiment illustrated in FIG. 7 is copy resistant to all known standard magnetic reading devices.

Figure 8:
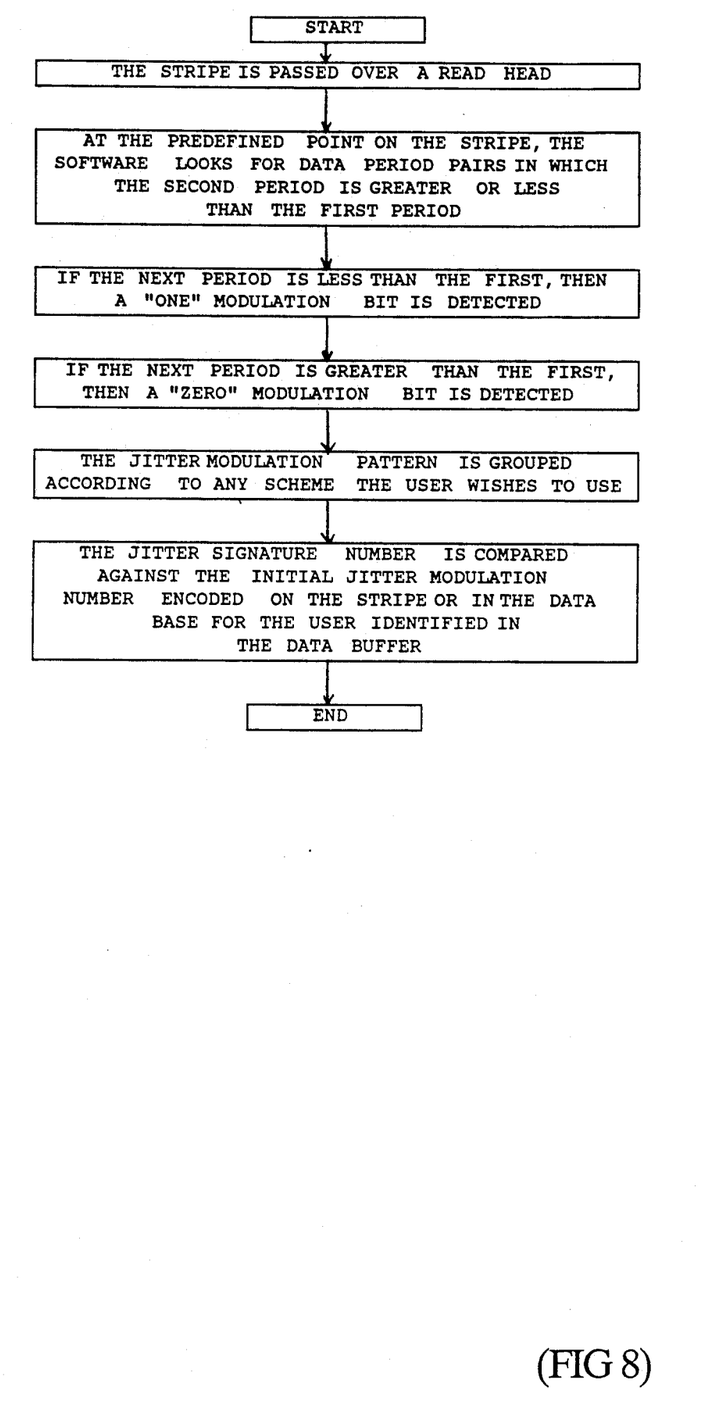
FIG. 8 is a flow chart of the steps of the process of reading the Jitter Signature and grouping it according to a method selected by the user.

FIG. 8 illustrates another embodiment of this invention in which the steps of the process of reading the Jitter Signature and grouping it into a pattern according to the pattern selected for a particular application are outlined. This technique allows the desired jitter modulation pattern is preselected based on the features which best enhance a particular application. In this embodiment the Jitter Signature number from a subsequent reading of the magnetically encoded data is compared against the initial Jitter Signature encoded on the card or stored in the database 55B through the logic of microprocessor 55. The database may contain other data interrelated to the particular application by which the user derives benefit from the pre-selection of the jitter modulation pattern such as a Personal Identification Number (PIN).

Because of other variations in magnetic media materials, sizes, tracks of data, changes and modifications may be made to the embodiments described, it is intended that all matters in the foregoing description be interpreted as illustrated and not as limitations of the invention or the scope of the appended claims. It is to be understood that no limitation with respect to the specific apparatus illustrated herein is intended or should be inferred.

What is claimed as now and the joint inventors desire to secure by Letters of Patent of the United States is:

1. A method of securing magnetically encoded data by a means of using inherent variations in the timing of magnetically encoded data in combination with the randomly varying effect of the magnetic media comprising:
    deriving the inherent timing variations of the data by reading the magnetically encoded data after initial encoding;
    storing the initial timing data stream by representation as the initial Jitter Signature number;
    comparing the jitter pattern of the timing data stream of any subsequent reading of the magnetically encoded data to the initial timing data stream generated from the stored initial Jitter Signature number; and
    indicating the results of the comparison.

2. A method as in claim 1 with the jitter representation of the initial timing data stream encoded and stored in a track of data on the card.

3. A method as in claim 1 with the jitter representation of the initial timing data stream encoded and stored in a database.

4. A method as in claim 1 with the jitter enhanced by a controlled amount of deliberate jitter.

5. A method as in claim 4 with the jitter enhanced by deliberate random jitter by means of a random number generator.

6. A method as in claim 1 with the jitter enhanced by a random amount of media enhanced jitter.

7. A method as in claim 1 with the means to detect the timing variations of oriented magnetic structures of the magnetic media and to create a Jitter Signature number.

8. A method as in claim 1 with the jitter enhanced by a predetermined percentage of deliberate jitter.

9. A method as in claim 1 with the means to modulate the jitter to a pre-selected pattern.

10. A method of securing magnetically encoded data from altering, buffering, counterfeiting, copying, forging, and skimming by means of detecting the random varying effect of the magnetic media and combining it with the inherent variations in the timing of magnetically encoded data comprising:
    reading the magnetically encoded data after encoding;
    storing the initial timing data stream as a representation as the initial Jitter Signature number;
    comparing the jitter pattern of the timing data stream of subsequent reading of the magnetically encoded data to the initial timing data stream generated from the stored initial Jitter Signature number; and
    indicating the results of the comparison.

11. A method as in claim 10 with the jitter representation of the initial timing data stream encoded and stored in a track of data on the card.

12. A method as in claim 10 with the jitter representation of the initial timing data stream encoded and stored in a database.

13. A method as in claim 10 with the jitter enhanced by a controlled amount of deliberate jitter.

14. A method as in claim 13 with the jitter enhanced by deliberate random jitter by means of a random number generator.

15. A method as in claim 10 with the jitter enhanced by a random amount of media enhanced jitter.

16. A method as in claim 10 with the means to detect the timing variations of oriented magnetic structures and to create a Jitter Signature number.

17. A method as in claim 10 with the jitter enhanced by a predetermined percentage of deliberate jitter.

18. A method as in claim 10 with the means to modulate the jitter to a pre-selected pattern.

19. An apparatus to determine the unique Jitter Signature pattern and to verify the authenticity of magnetically encoded data by means of using inherent variations in the timing of encoded data in combination with the random effect of the magnetic media, the apparatus comprising:
    a means for reading the magnetically encoded data after encoding;
    a means for detecting the timing data stream;
    a means for storing the initial timing data stream by representation as the initial Jitter Signature number;
    a means for comparing the jitter pattern of the timing data stream of any subsequent reading of the magnetically encoded data to the initial timing data stream generated from the stored initial Jitter Signature number; and
    a means for indicating the results of the comparison.

20. An apparatus as in claim 19 with the means to encode and store the jitter representation of the initial timing data stream in a track of data on the card.

21. A method as in claim 19 with the jitter representation of the initial timing data stream encoded and stored in a database.

22. An apparatus as in claim 19 with the means to enhance the jitter by a controlled amount of deliberate jitter.

23. An apparatus as in claim 22 with the means to enhance the jitter with a random number generator.

24. An apparatus as in claim 19 with the means to enhance jitter by a random amount of media enhanced jitter.

25. An apparatus as in claim 19 with the means to detect the timing variations of oriented magnetic structures and create a Jitter Signature number.

26. An apparatus as in claim 19 with the means to enhance the jitter by a predetermined percentage of deliberate jitter.

27. An apparatus as in claim 19 with the means to modulate the jitter to a pre-selected pattern.

28. A method of securing magnetically encoded data by a means of detecting random variations in the timing of magnetically encoded data combined with the random effect of the magnetic media comprising:

a means for deriving the timing variations of the data by reading encoded data and storing the initial timing data stream by representation as the initial Jitter Signature number at the end of the data in the trailing zeros of the magnetically encoded data;

comparing the jitter pattern of the timing data stream of a subsequent reading of the magnetically encoded data to the initial timing data stream generated from the stored initial Jitter Signature number; and a means for indicating the results of the comparison.

29. A method of securing magnetically encoded data by a means of using random variations in the timing of encoded data in combination with random varying effect of magnetic material comprising:

detecting by reading magnetically encoded data after encoding on magnetic computer tapes, disks, labels, tickets, fare cards, plastic cards, decrementing value cards, magnetic striped documents, and magnetic materials;

storing the initial timing data stream by representation as the initial Jitter Signature number on the magnetic media;

comparing the timing data stream of any subsequent reading of the encoded data to the initial timing data stream generated from the stored initial Jitter Signature number; and indicating the results of the comparison.

* * * * *